US008373546B2

(12) United States Patent
Nagasawa

(10) Patent No.: US 8,373,546 B2
(45) Date of Patent: Feb. 12, 2013

(54) MOBILE BODY REMOTE CONTROL SYSTEM

(75) Inventor: Satoshi Nagasawa, Chiba (JP)

(73) Assignee: Futaba Corporation, Mobara-shi, Chiba (JP)

( * ) Notice: Subject to any disclaimer, the term of this patent is extended or adjusted under 35 U.S.C. 154(b) by 597 days.

(21) Appl. No.: 12/638,684

(22) Filed: Dec. 15, 2009

(65) Prior Publication Data

US 2010/0164692 A1 Jul. 1, 2010

(30) Foreign Application Priority Data

Dec. 25, 2008 (JP) ................................ 2008-329514

(51) Int. Cl.
*H04B 5/02* (2006.01)

(52) U.S. Cl. ..................... 340/12.22; 455/41.1; 180/168

(58) Field of Classification Search ................. 340/10.1, 340/10.5, 12.22, 901, 988; 701/23; 180/167–168; 446/454; 343/741, 742, 821, 859; 455/274, 455/282, 523, 41.1

See application file for complete search history.

(56) References Cited

U.S. PATENT DOCUMENTS

| | | | | | |
|---|---|---|---|---|---|
| 2,818,562 | A | * | 12/1957 | Carter | 343/742 |
| 4,215,759 | A | * | 8/1980 | Diaz | 180/168 |
| 4,600,926 | A | * | 7/1986 | Powell | 343/742 |
| 4,816,766 | A | * | 3/1989 | Zabel et al. | 324/318 |
| 5,548,815 | A | * | 8/1996 | Takayama et al. | 455/41.1 |

FOREIGN PATENT DOCUMENTS

| | | | |
|---|---|---|---|
| JP | 61-224735 | | 10/1986 |
| JP | 2005-045327 | | 2/2005 |
| JP | 2005045327 | * | 2/2005 |

* cited by examiner

*Primary Examiner* — Edwin Holloway, III
(74) *Attorney, Agent, or Firm* — Quarles & Brady LLP

(57) ABSTRACT

A system that remotely controls a mobile body includes a guideway (i.e., balanced feeder line) for guiding the mobile body to its destination, and a coupling device provided on the mobile body for transmitting and receiving control information to control movement of the mobile body along the guideway. The coupling device includes a first loop antenna and a second loop antenna that are cross-connected to each other. A distance from the center of the balanced feeder line to the center of the first loop antenna is less than a distance from the center of the balanced feeder line to the center of the second loop antenna. The system can operate with an extremely low power of emission with a weak electric field intensity of a radio wave for controlling the movement of the mobile body.

6 Claims, 12 Drawing Sheets

120

MOBILE BODY REMOTE CONTROL SYSTEM

CROSS REFERENCE TO RELATED APPLICATIONS

This application claims priority to Japanese Patent Application No. 2008-329514 filed on Dec. 25, 2008, the contents of which are fully incorporated herein by reference.

STATEMENT CONCERNING FEDERALLY SPONSORED RESEARCH OR DEVELOPMENT

Not applicable

BACKGROUND OF THE INVENTION

1. Field of the Invention

The present invention relates to a remote control system for remotely controlling movement of a mobile body along a guideway.

2. Description of the Related Art

Use of various automated operating machines for laborsaving is prominent in recent years in manufacturing facilities of semiconductor circuits, which require ultraprecision machining, and in factories of various machine parts. Transfer boots, dollies, and other mobile bodies that automatically move to a predetermined destination are used to convey materials for operating machines, processed products, and various machining tools.

Most of these mobile bodies have an antenna (i.e., a coupling device) for noncontact wireless communications through electromagnetic induction coupling between the mobile body and a guideway arranged in a factory or warehouse.

The antenna of the mobile body allows bidirectional communications between the mobile body and a fixed control apparatus. More specifically, various control signals for controlling the mobile body are output by the fixed control apparatus, transmitted via the guideway, and received by the antenna of the mobile body. Also, various radio-frequency waves that have been modulated by a signal of the mobile body are output on the antenna and received by the fixed control apparatus connected to the guideway.

Japanese Patent Application Publication S61-224735 discloses a conventional communications system. The conventional communications system includes: (a) a mobile body having a loop antenna, and (b) a guideway. More specifically, a balanced cable, which serves as the guideway, is arranged on the floor, and the mobile body is slid along the guideway through electromagnetic coupling or electric field coupling established by its loop antenna for communications between the mobile body and a fixed apparatus connected to the guideway.

Japanese Patent Application Publication 2005-045327 discloses a coupling device for communications between a mobile body and a ground-side guideway, where communications are made mainly through inductive magnetic field coupling.

FIG. 12 of the latter document schematically illustrates a conventional remote control system for controlling the mobile body using the coupling device. The guideway 1 may be arranged on a surface of a floor or hung from a ceiling. The guideway 1 is a balanced feeder line with two parallel wires 1*a*, 1*b* held and supported by a dielectric material 1*c*.

Also, the coupling device 2, which serves both as a receiving device and as a transmission antenna, is disposed at a predetermined portion of the transfer dolly 3. The coupling device 2 has one electrostatically shielded loop antenna in a shape of a loop for receiving a radio-frequency wave that goes out of the feeder line 1 and transmitting information from the transfer dolly 3.

In general, the strength of an electromagnetic field given rise to by a wave source can be divided into components that change depending upon a distance R from the wave source to a radio equipment. The components can be schematically classified into a quasi-electrostatic field component ($1/R^3$), that is inversely proportional to the cube of the distance R, an induced electric field component ($1/R^2$), that is inversely proportional to the square of the distance R, and a radiation electromagnetic field component (1/R), that is inversely proportional to the distance R.

As shown in FIG. 13, although the $1/R^3$ component and the $1/R^2$ component attenuate rapidly as the distance R becomes larger, the 1/R component can travel a relatively long distance.

The conventional mobile body remote control system shown in FIG. 12 employs inductive magnetic field coupling for communications between the balanced feeder line T and the coupling device 2 that are proximate to each other.

SUMMARY OF THE INVENTION

A receiving device of a radio equipment or other communications devices receives not only a desired wave but also undesired waves. Needless to say, the desired wave is an electromagnetic wave emitted by the other party of intended communications. Meanwhile, the undesired wave is an interfering wave that is emitted by any parties other than the other party and foreign to the intended communications with the other party. Components of the received undesired wave interfere with extraction of the components of the received desired wave that are necessary for successful communications.

Since other devices and components operating along with the mobile body more or less emit electromagnetic waves, the desired wave for the mobile body communications system is the electromagnetic wave for communications between the guideway and the loop antenna, and every electromagnetic wave emitted by other devices and/or components other than the desired wave is in this sense undesired or spurious, interfering with the communications between the guideway and the loop antenna. In addition, in an environment where various devices and components potently emit such undesired waves, the undesired waves could reach a long distance even when they are installed at locations remote from the mobile body communications system.

The magnitude of influence that the components of the undesired wave can exert upon the mobile body communications system depends upon the power relation between the desired wave components and the undesired wave components. Specifically, in order to ensure favorable communications quality, it is preferable that the components of the undesired waves that are received by the antenna be sufficiently small relative to the components of the desired wave.

Generally, the influence of the undesired wave components can be expressed in units of decibel (dB) using a desired-to-undesired (D/U) signal ratio (i.e., D/U ratio). The D/U ratio is a ratio of the desired wave components to the undesired wave components.

FIG. 14 shows graphs illustrating the relationship between output of a conventional single electrostatically shielded loop antenna and a distance from the coupling device to a wave source. The horizontal axis represents the distance, wherein it is assumed that the wave source is at the origin. The vertical axis represents the strength of the electromagnetic wave output by the coupling device. Curves A, B, and C share the same scale on the horizontal and vertical axes.

Since the single electrostatically shielded loop antenna draws on inductive magnetic field as its primary medium of coupling, it outputs an output component, Dout1, in response to a signal sent from the desired-wave source (i.e., the guideway), as indicated by curve A, which is inversely proportional to the cube of the distance R. It should be noted that the desired-wave source is at the origin of the horizontal axis for curve A and that the distance d between the electrostatically shielded loop antenna and the desired-wave source is small.

Meanwhile, the single electrostatically shielded loop antenna outputs an output component Uout1 as indicated by curve B, which is inversely proportional to the distance R for the signal sent from an undesired-wave source (i.e., other devices) that is more remotely located than the above-mentioned distance d. The undesired-wave source is at the origin on the horizontal axis for curve B.

Further, if the strength of the undesired wave is increased in the neighborhood of the single electrostatically shielded loop antenna, curve B will shift upward, for example, to become curve C, and an output component, Uout2, is output that is larger than the Uout1 component.

This means that, in response to increased strength of the undesired wave in the neighborhood of the single electrostatically shielded loop antenna, the output value corresponding to the undesired wave becomes larger. In this case, if the electric field intensity of the desired wave remains the same, the D/U ratio becomes smaller, and as a result, the mobile body communications system may fail to ensure favorable communications quality and, in the worst-case scenario, the system may be unable to perform meaningful communications.

A countermeasure to the above-identified inconvenience would be to increase the electric field intensity of the desired wave to improve the D/U ratio. However, this in turn may cause malfunction of other devices and components around the single electrostatically shielded loop antenna. Understandably, increased undesired waves for the other communications devices and components will cause interference with or disturbance to their communications.

Also, use of a mobile body with such intense electric field or high power of emission may not be compliant with laws and regulations governing use of radio equipment and other communications devices.

In view of the above-identified problems, a purpose of the present invention is to provide a mobile body remote control system that is capable of achieving successful transmission and reception of a control signal for controlling movement of a mobile body while allowing the electric field in use to be specified to be weak, and at the same time capable of ensuring sufficient communications quality and reducing undesired spurious waves that may cause interference with and/or disturbance to other devices in distant locations.

The mobile body remote control system of the present invention includes: (a) a guideway for guiding a mobile body to a predetermined place, the guideway being a balanced feeder line including a pair of parallel conductor lines spaced from each other and a dielectric body supporting the parallel conductor lines; and (b) a coupling device provided on the mobile body for transmission and reception of control information used to control movement of the mobile body along the guideway. The coupling device includes a first loop antenna having a pair of outputs and a second loop antenna having a pair of outputs that are cross-connected to the pair of outputs of the first loop antenna. A distance from the center of the guideway to the center of the first loop antenna is less than a distance from the center of the guideway to the center of the second loop antenna.

Preferably, the first loop antenna and the second loop antenna are electrostatically shielded loop antennas each made by bending a coaxial cable to take the shape of a loop, the coaxial cable having a slit on a portion of an outer shield thereof. A diameter of the first loop antenna and a diameter of the second loop antenna are each equal to or less than a tenth ($1/10$) of a wavelength ($\lambda$) of a radio wave for use in the transmission and reception of the control information. The distance from the first loop antenna to the balanced feeder line is in a range from one thirtieth (1/30) to one two-hundredth (1/200) of the wavelength ($\lambda$).

Preferably, the first loop antenna and the second loop antenna are concentrically arranged and spaced from each other, and the center of the guideway is passed through by an axis of the concentrically arranged first and second loop antennas.

Alternatively, the center of the balanced feeder line may be level with and parallel to a plane of the loop of the first loop antenna. Further, the plane of the loop of the first loop antenna may be level with and parallel to a plane of the loop of the second loop antenna.

Advantageous effects of the present invention are as follows.

Since the mobile body remote control system of the present invention is capable of increasing the D/U ratio of the desired wave to the undesired wave emitted by the other devices, favorable quality of communications is ensured even in an environment where the undesired waves, such as electromagnetic waves generated by the other devices in operation, exist.

At the same time, since the mobile body remote control system of the present invention is capable of operating with extremely low power emission using weak electric field intensity for transmission and reception of the control information between the guideway and the coupling device, it is possible to suppress undesired or spurious waves emitted by the system itself that may cause interference with and/or disturbance to other remotely installed devices.

In addition, since reversibility of transmission and reception is established in the mobile body remote control system of the present invention, emission of radio waves from the coupling device to a distant place can be effectively reduced.

BRIEF DESCRIPTION OF THE DRAWINGS

The foregoing and other objects, features, and advantages of the invention will be apparent upon reading of the following detailed description taken in conjunction with the accompanying drawings in which.

DETAILED DESCRIPTION OF THE PREFERRED EMBODIMENTS

In the following detailed description of exemplary embodiments of the present invention, reference is made to the accompanying drawings showing, by way of illustration, specific exemplary embodiments in which the present invention may be practiced.

Figure 1:
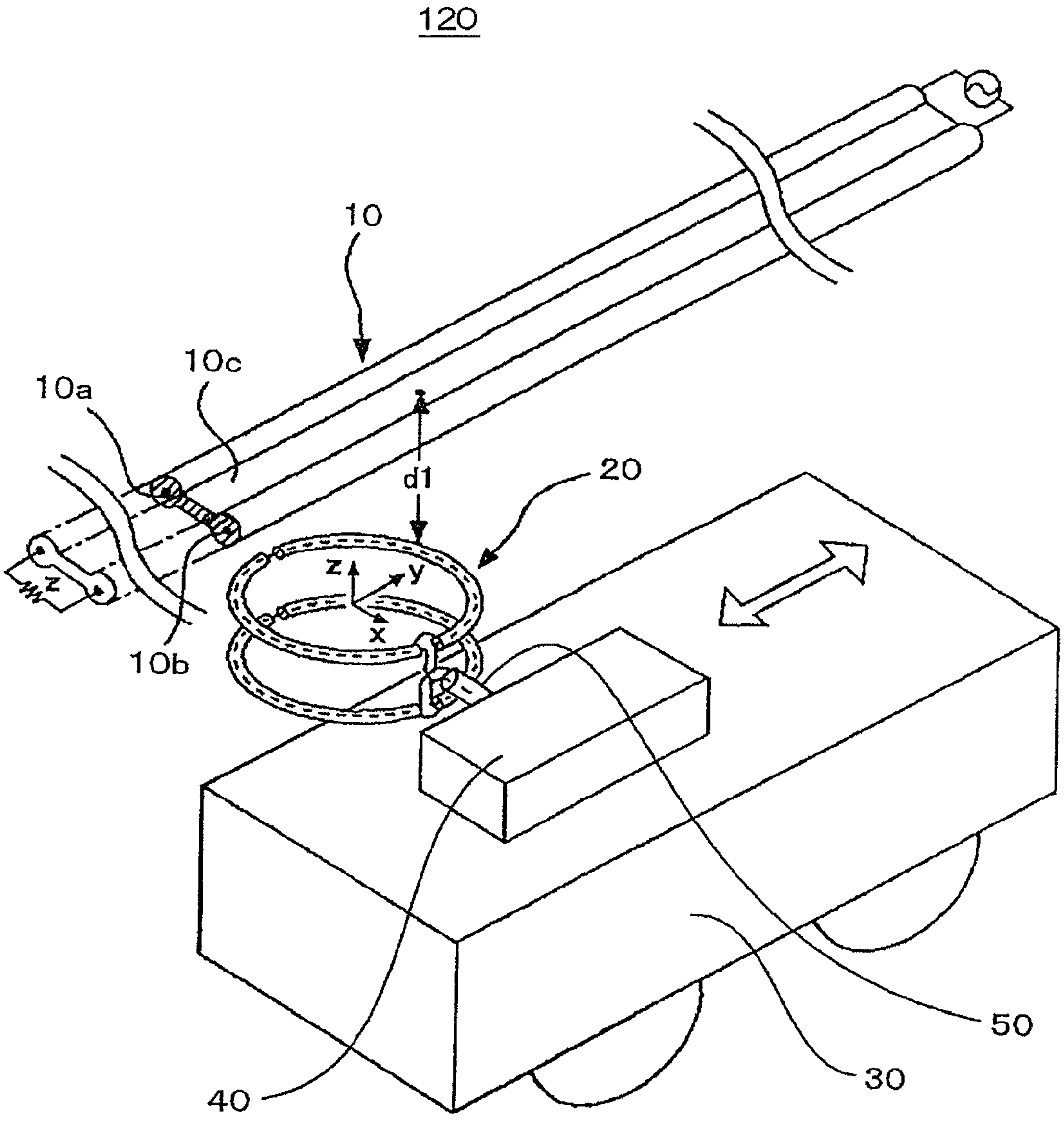
FIG. 1 is a schematic view illustrating principal parts of a mobile body remote control system according to one embodiment of the present invention.

Referring to FIG. 1, principal portions of a remote control system designed to control a mobile body 30 (i.e., a mobile body remote control system 120) according to one embodiment of the present invention are shown.

The mobile body remote control system 120 includes a balanced feeder line 10 for guiding a mobile body 30 to its destination and a coupling device 20 provided on the mobile body 30.

The balanced feeder line 10 includes two conductive wires 10*a*, 10*b* that are parallel to each other and a dielectric material 10*c* that holds the conductive wires 10*a*, 10*b* . The conductive wires 10*a*, 10*b* along with the dielectric material 10*c* partly extend in a direction Y and a cross section of the balanced feeder line 10 in FIG. 1 is taken along a direction X orthogonal to the direction Y in FIG. 1.

The coupling device 20 includes a first loop antenna 21 having a pair of outputs, a second loop antenna 22 having a pair of outputs, and a connecting portion 23 to provide electrostatic shielding and extract a difference between currents flowing in these two loop antennas. A pair of outputs of the first loop antenna 21 are cross-connected to a pair of outputs of the second loop antenna 22, respectively. The configuration of the coupling device 20 will be described later in detail.

The coupling device 20 is secured to the mobile body 30 on an x-y plane such that a clearance by a distance d1 is maintained between the coupling device 20 and the balanced feeder line 10, or more specifically, between the x-y plane and the balanced feeder line 10.

The coupling device 20 is connected to a transmission-reception circuit 40 of the mobile body 30 so as to enable data transmission and reception between the mobile body 30 and the balanced feeder line 10.

This means that the balanced feeder line 10 generates an inductive magnetic field when a high-frequency current, modulated by a control signal output by a system controller installed, for example, in a factory, flows in the balanced feeder line 10. The coupling device 20 picks up the irradiated inductive magnetic field and converts it into an electrical signal. The electrical signal is then demodulated by the transmission-reception circuit 40 into the control data.

The coupling device 20 of the mobile body 30 employs an inductive magnetic field to transmit information regarding the mobile body 30 via the coupling device 20 to the balanced feeder line 10. The information is transmitted over the balanced feeder line 10 to the system controller connected to the balanced feeder line 10. The information transmitted to the system controller includes, by way of example, an identification number of the mobile body 30 and a state of the mobile body 30. The balanced feeder line 10 may include a matched impedance Z attached to one end thereof and either a power source S for transmission or a terminal for reception attached to the other end thereof.

Although, as will be discussed below, it is possible to contemplate more than one configuration of the coupling device 20 according to one embodiment of the present invention. In any case, coupling by the coupling device 20 between the balanced feeder line 10 and the mobile body 30 of the present invention is achieved through the inductive magnetic field used as the primary medium of coupling.

Figure 2:
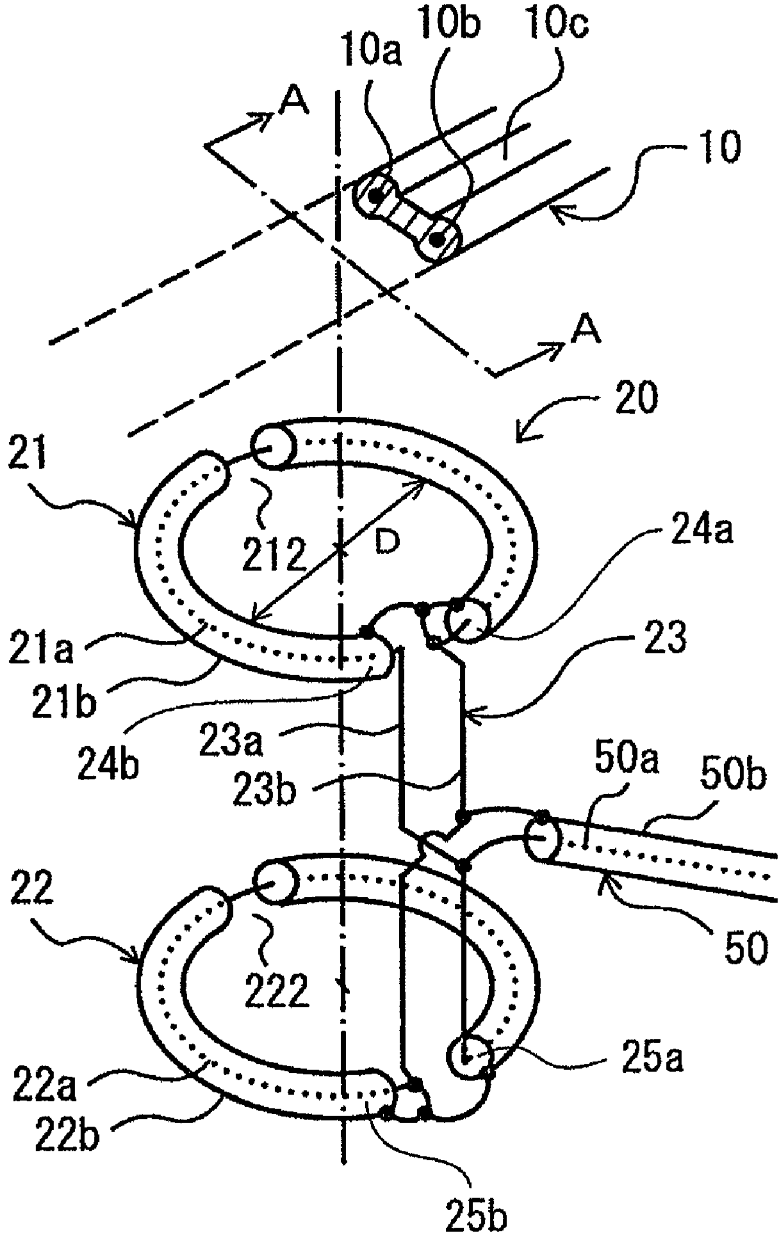
FIG. 2 illustrates a coupling device according to one embodiment of the present invention.

With reference to FIG. 2, as a first configuration of the coupling device 20 along with construction of its loop antennas, there is shown an enlarged view of the coupling device 20 of FIG. 1 and its vicinity, in which the coupling device 20 includes the first loop antenna 21, the second loop antenna 22, and the connecting portion 23.

Figure 3:
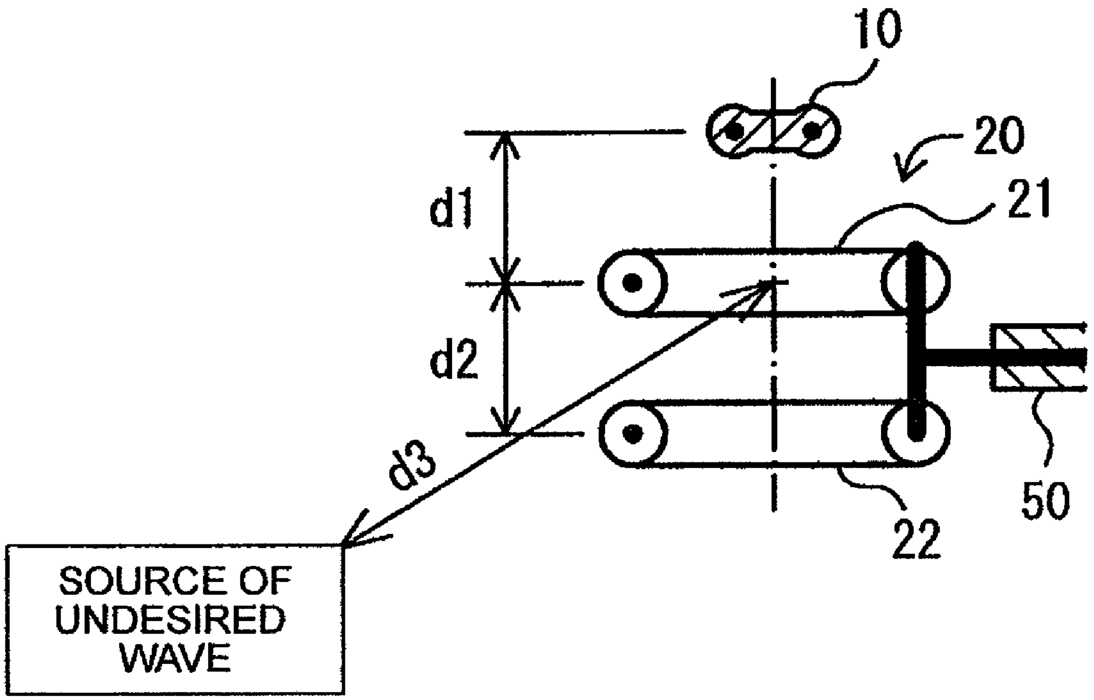
FIG. 3 illustrates a cross section of the coupling device with the center line thereof indicated.

FIG. 3 illustrates cross sections of the balanced feeder line 10 and the two loop antennas 21, 22 viewed in a direction indicated by arrows A in FIG. 2, and the center line or axis line of the coupling device 20 in FIG. 2.

The first loop antenna 21 takes the shape of a small loop whose diameter D is equal to or less than a tenth (1/10) of a wavelength λ (lambda) of the electromagnetic wave employed. As shown in FIG. 2, a slit 212 is provided at an intermediate portion of the first loop antenna 21.

An inner conductor 21 a of the first loop antenna 21 is partly exposed to the outside at the slit 212. One end 24*a* of the inner conductor 21*a* is connected to an outer conductor 21*b* to serve as one output (also indicated by the same reference sign 24*a*) of the first loop antenna 21. The other end 24*b* of the first loop antenna 21 serves as the other output thereof (also indicated by the same reference sign 24*b*). It can also be seen in FIG. 2 that one end of the outer conductor 21*b* of the first loop antenna 21 is connected, on its side opposite the slit 212, to the other end thereof.

The second loop antenna 22 has a substantially identical size and dimension with those of the first loop antenna 21.

An inner conductor 22*a* of the second loop antenna 22 is partly exposed to the outside at a slit 222. One end 25*b* of the inner conductor 22*a* is connected to an outer conductor 22*b* to serve as one output (also labeled as 25*b*) of the second loop antenna 22. The other end 25*a* serves as the other output of the second loop antenna 22 (also labeled as 25*a*). It can also be seen in FIG. 2 that one end of the outer conductor 22*b* of the second loop antenna 22 is connected, on its side opposite the slit 222, to the other end thereof.

The first loop antenna 21 and the second loop antenna 22, with the above-described configurations, function as a loop antenna according to one embodiment of the present invention that provides magnetic coupling through the inductive magnetic field as the primary medium of coupling. The outer conductor 21*b* provides electrostatic shielding against external electromagnetic fields and the loop-shaped inner conductor 21*a* provides magnetic field coupling through the inductive magnetic field.

Further, these two loop antennas 21, 22 are concentrically arranged with their centers resting upon the same vertical straight line, are spaced from each other by a distance D2 in the direction of the z axis, and each loop is on a plane that is parallel to the other loop's plane and is substantially orthogonal to the z axis (it is assumed that the planes of each loop are parallel to the x-y plane, as viewed from one side of the center line).

The several paragraphs that follow summarize the cross-connection of two loop antennas according to one embodiment of the present invention.

One end 24*a* of the first loop antenna 21 is connected to one end 25*b* of the second loop antenna 22. Likewise, the other end 24*b* of the first loop antenna 21 is connected to the other end 25*a* of the second loop antenna 22. This constitutes the basic configuration of two cross-connected loop antennas.

It should be noted that the reference signs 24*a*, 24*b*, 25*a*, and 25*b* in FIG. 2 are assigned so that the substantial dimensional identity of the two loop antennas 21, 22 and the state of cross-connection are both emphasized.

To be more specific, the outputs of these two loop antennas 21, 22 are connected to each other via the connecting portion 23 that includes a connecting wire 23*a* and a connecting wire 23*b*.

The connecting wire 23*a* connects output 24*b* of the first loop antenna 21 to output 25*a* of the second loop antenna 22. Likewise, the connecting wire 23*b* connects output 24*a* of the first loop antenna 21 to output 25*b* of the second loop antenna 22.

Since the first loop antenna 21 and the second loop antenna 22 are cross-connected to each other via the connecting portion 23, the configuration of the coupling device 20 as depicted in the foregoing may be referred to as a "parallel cross-connection" of the first loop antenna 21 and the second loop antenna 22.

Operation of such "parallel cross-connected" loop antennas will be described later in detail.

Still referring to FIG. 2, an output coaxial cable 50 is connected to a half-way point of the connecting portion 23. An output current of the coupling device 20 is transmitted to the transmission-reception circuit 40 via the coaxial cable.

An inner conductor 50*a* of the output coaxial cable 50 is connected to the connecting wire 23*a*, and an outer conductor 50*b* of the output coaxial cable 50 is connected to the connecting wire 23*b*.

Alternatively, the shape of the loop of the first loop antenna 21 and the second loop antenna 22 may be polygonal.

Also, only one coaxial cable may constitute the first loop antenna 21, the connecting wire 23*a*, and the second loop antenna 22, continuing from end 24*a* of the first loop antenna 21 through end 24*b* of the first loop antenna 21, the connecting wire 23*a*, end 25*a* of the second loop antenna 22, and lastly, end 25*b* of the second loop antenna 22. In this case, the connecting wire 23*a* may be obtained by a core wire of the one coaxial cable, which is exposed to the outside at a large slit on a portion of the coaxial cable corresponding to the connecting portion 23.

When output efficiency of the coupling device 20 is to be improved, a matching circuit (not shown) for impedance matching may be inserted between the connecting portion 23 and the output coaxial cable 50, or somewhere in the middle of the output coaxial cable 50.

In the above embodiment, the two loop antennas 21, 22 are parallel-cross-connected to each other. Alternatively, the loop antennas 21, 22 may be cross-connected not in parallel, but in series.

Cross-connecting the loop antennas 21, 22 in series can be achieved by modifying the configuration of the connecting portion 23 shown in FIG. 2.

Specifically, the inner conductor 50*a* of the output coaxial cable 50 is connected to output 25*a* of the second loop antenna 22, output 25*b* of the second loop antenna 22 is connected to output 24*a* of the first loop antenna 21, and output 24*b* of the first loop antenna 21 is connected to the outer conductor 50*b* of the output coaxial cable 50.

The principles of operation of these series-connected loop antennas will be later described in detail.

Figure 4:
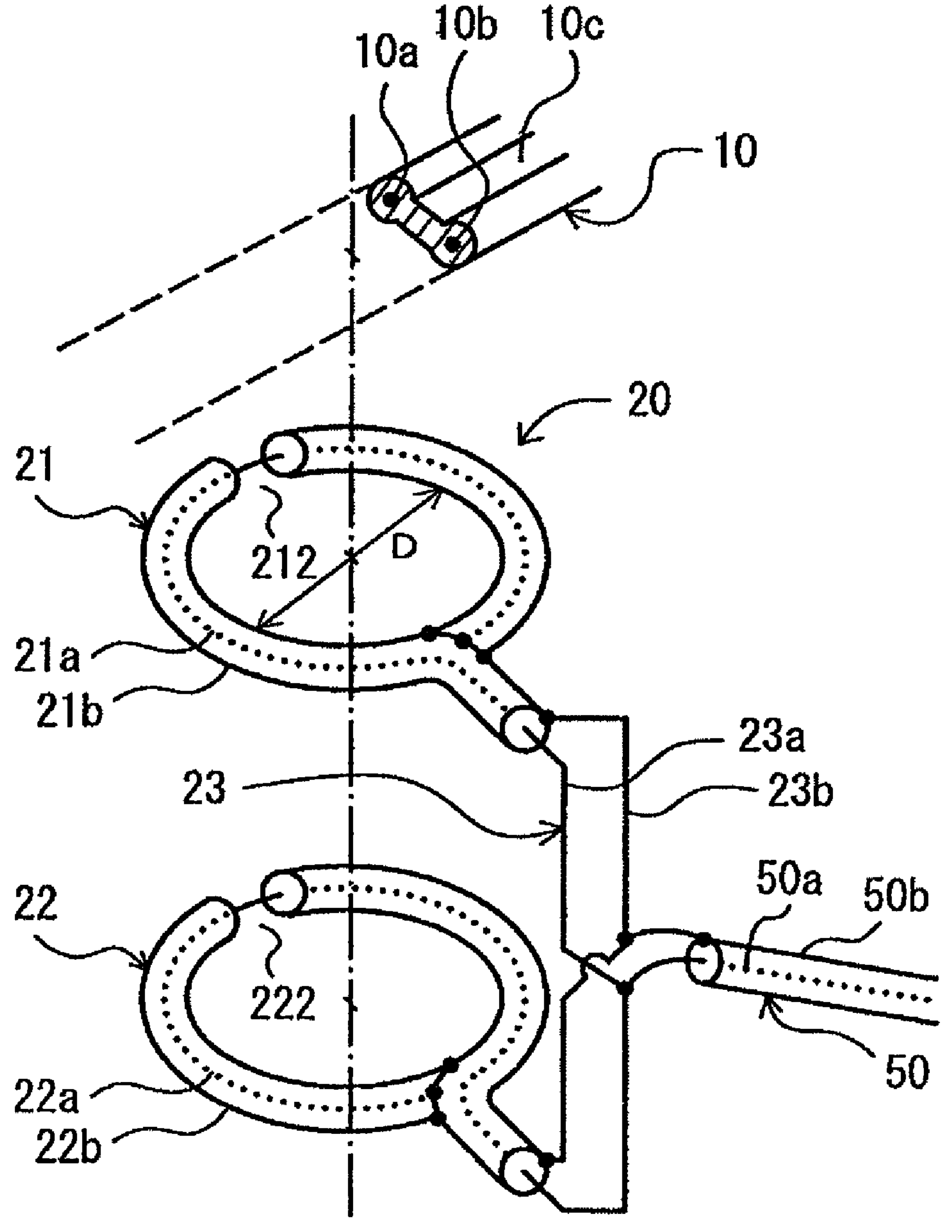
FIG. 4 illustrates a coupling device according to another embodiment of the present invention.

With reference now to FIG. 4, another embodiment of the loop antennas 21, 22 of the coupling device 20 is shown. The following describes this configuration focusing on features distinct from the embodiment shown in FIG. 1 and detailed explanation of the identical features is omitted for simplicity.

As shown in FIG. 4, the inner conductor 21 a is directly connected to the outer conductor 21*b* at one end of the first loop antenna 21. Likewise, one end of the inner conductor 22*a* is directly connected to the outer conductor 22*b* at one end of the second loop antenna 22.

Thus, the manufacturing of the coaxial cable is facilitated by simplified processing of the ends of the loop antennas 21, 22.

The output of the first loop antenna 21 and the output of the second loop antenna 22 are connected to each other via the connecting portion 23. Specifically, the connecting wire 23 a connects the inner conductor 21 a of the first loop antenna 21 to the inner conductor 22*a* of the second loop antenna 22. The connecting wire 23*b* connects the outer conductor 21*b* of the first loop antenna 21 to the outer conductor 22*b* of the second loop antenna 22.

The principles of operation of the coupling device 20 according to the embodiments of the present invention are described below in the context of the (i) parallel cross-connection and (ii) the series cross-connection of the two loop antennas 21, 22.

Figure 5:
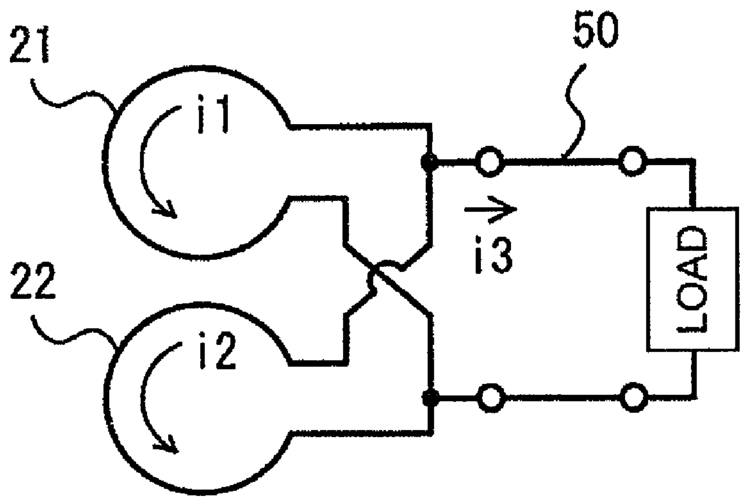
FIG. 5 is a schematic view of the coupling device constructed by crosswise connecting in parallel a first loop antenna and a second loop antenna, with a circuit that follows the coupling device regarded as an alternating-current circuit.

Referring to FIG. 5, the coupling device 20 of FIG. 2 is schematically illustrated along with the transmission-reception circuit 40 regarded for simplicity as an alternating-current circuit connected to the loop antennas 21, 22. As has been explained in the foregoing, the first loop antenna 21 and the second loop antenna 22 are parallel-cross-connected, and their outputs are connected to a load via the output coaxial cable 50.

The reference sign "i1" indicates a current that flows in the first loop antenna 21 as a result of change in the magnetic field lines entering the first loop antenna 21. The reference sign "i2" indicates a current that flows in the second loop antenna 22 as a result of change in the magnetic field lines entering the second loop antenna 22. The reference sign "i3" indicates a current that is output from the coupling device 20 to an external load. The same reference signs are assigned to other items identical with those shown in FIG. 2.

If the amount of change in the magnetic field lines is the same for both those entering the first loop antenna 21 and those entering the second loop antenna 22, then the current i1 is offset by the current i2, and because the first loop antenna 21 and the second loop antenna 22 are parallel-cross-connected, no current i3 will be output. In contrast, if the amount of change in the magnetic field lines is not the same for those entering the first loop antenna 21 and those entering the second loop antenna 22, a current corresponding to the difference in the change in the magnetic field lines will be output as the current i3.

This means that, since the coupling device 20 is configured by parallel-cross-connecting the first loop antenna 21 and the second loop antenna 22, the difference of the currents flowing in the first loop antenna 21 and the second loop antenna 22 is extracted as an output.

Figure 6:
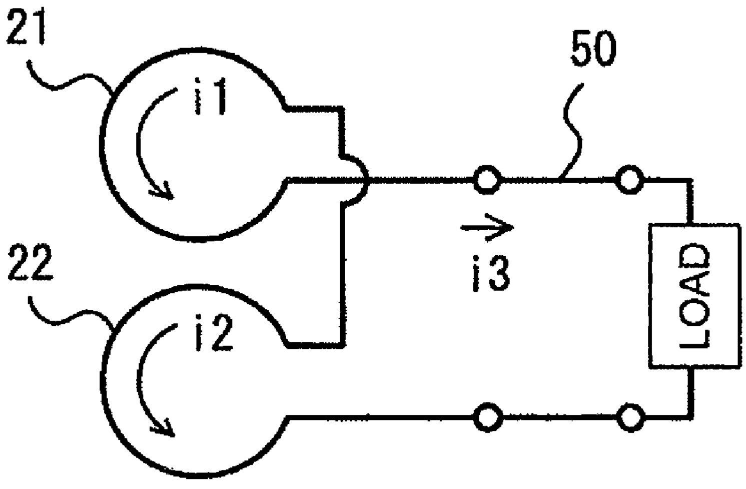
FIG. 6 is a schematic view of the coupling device made by crosswise connecting the first loop antenna and the second loop antenna in series, with a circuit that follows the coupling device regarded as an alternating-current circuit.

FIG. 6 schematically illustrates a current path in a case where, as introduced as the alternative embodiment of the coupling device 20, the first loop antenna 21 and the second loop antenna 22 are cross-connected in series, assuming that the coupling device 20 and the portions connected thereto are an alternating current circuit.

The electric currents i1, i2, i3 in no way differ from those shown in FIG. 5, which are generated by the magnetic field lines according to the same principles as in FIG. 5.

This means that the coupling device 20 is capable of extracting as an output the difference between the electric currents flowing through the first loop antenna 21 and the second loop antenna 22, respectively, even when the first loop antenna 21 and the second loop antenna 22 are cross-connected in series.

Next, the principles of operation regarding the output of the coupling device with respect to the desired wave and the undesired wave are described.

Figure 7:
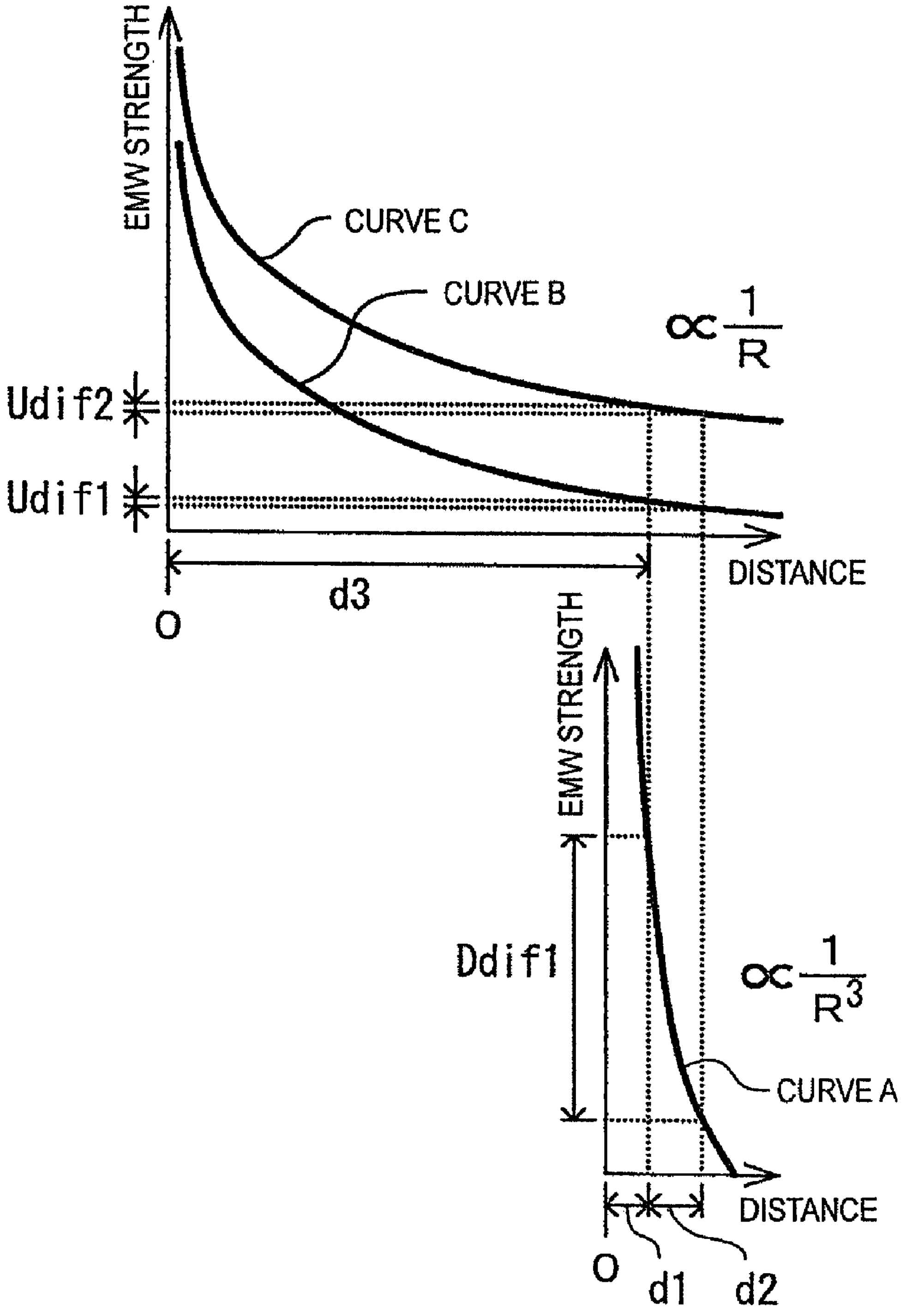
FIG. 7 explains the relationship between the output of the coupling device and a distance between the coupling device and a wave source.

The following explains how the ratio of an output corresponding to the desired wave to an output corresponding to the undesired wave (i.e., D/U ratio) can be increased by the coupling device 20 according to one embodiment of the present invention with reference to FIG. 7.

As discussed in the foregoing, the coupling device 20 as applied to the mobile body remote control system 120, according to one embodiment of the present invention, includes two loop antennas 21, 22 that receive and transmit a radio wave. These two loop antennas exhibit an electrostatic shielding effect, so as to perform coupling by an electromagnetic field, in particular, coupling through an inductive magnetic field.

Further, the coupling device 20 has the outputs of the two loop antennas 21, 22 that are cross-connected, and is capable of extracting the difference between the electric currents that flow through the loop antennas 21, 22, respectively, when receiving the electromagnetic wave.

Also, out of the electromagnetic fields given rise to by the wave source, the quasi-electrostatic field component and the induced electric field component are mainly used as a medium for the magnetic coupling and do not reach a distant place, while the radiated electromagnetic field component can reach relatively distant places. Such characteristics have been explained in the foregoing.

FIG. 7 explains the relationship between the output of the coupling device 20 and the distance from the wave source to the coupling device 20. The horizontal axis represents the distance, assuming that the wave source is found at the origin on the horizontal axis. The vertical axis represents an output of the coupling device. The curves A, B, and C are measured by the same scale on the horizontal and vertical axes.

Also, it is assumed that the coupling device 20 includes the first loop antenna 21 and the second loop antenna 22 spaced from each other by the distance d2, and that the balanced feeder line 10 as the guideway is, as shown in FIGS. 2 and 3, arranged to be remote from the first loop antenna 21 of the coupling device 20 by the distance d1.

As shown in FIG. 3, the wave source emitting the undesired wave is assumed to be spaced from the coupling device 20 by a distance d3.

First, the output corresponding to the desired wave received by the coupling device 20 is explained.

Figure 13:
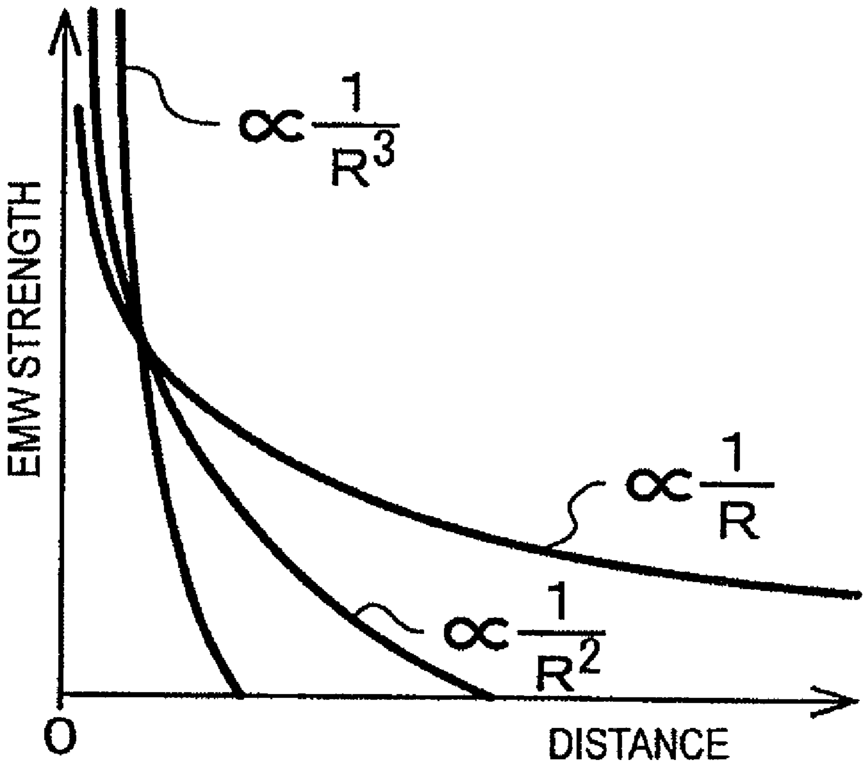
FIG. 13 explains an electromagnetic field component of the electromagnetic field given rise to by a wave source with respect to a distance between the coupling device and the wave source.

The distance d1 from coupling device 20 to the balanced feeder line 10 is in the range from λ/30 (lambda divided by thirty) to λ/200 (lambda divided by two hundred), which is sufficiently smaller than the wave length λ (lambda) of the frequency in use. Thus, the coupling device 20 and the balanced feeder line 10 are arranged at such a distance that they are sufficiently coupled by the component inversely proportional to the cube of R as shown in FIG. 13. For example, the distance d1 at 200 MHz will be in the neighborhood of 7.5 to 50 millimeters.

The desired wave received by the coupling device 20 is the electromagnetic wave emitted by the balanced feeder line 10, and, as mentioned in the foregoing, the quasi-electrostatic field will be dominant for the communications between the coupling device 20 and the balanced feeder line 10 that are positioned in close proximity to each other and are coupled by a magnetic field. Therefore, a curve indicative of the relationship between (a) the distance from the desired wave source to the coupling device 20 and (b) the electromagnetic field intensity when the wave source of the desired wave is at the origin of the horizontal axis is expressed as the curve for the component inversely proportional to the cube of R as shown in FIG. 13.

Since the coupling device 20 includes the two loop antennas 21, 22 spaced from each other by the distance d2 and extracts the difference between the electric currents flowing in these loop antennas, the output value corresponding to the desired wave is Ddif1, which corresponds to the distance d2.

Next, the following describes the output corresponding to the undesired wave that may be received by the coupling device 20.

The undesired wave received by the coupling device 20 includes electromagnetic waves other than that emitted by the balanced feeder line 10. Typical undesired waves are emitted by other devices and components.

The distance d3 from the coupling device 20 to the undesired wave source is one hundred times larger than the distance d1 from the coupling device 20 to the balanced feeder line 10.

This means that the undesired wave source is spaced from the coupling device 20 by the distance d3, which is sufficiently large when compared with the distance d1 from the coupling device 20 to the balanced feeder line 10. Accordingly, in this case, a curve indicative of the relationship between (a) the distance from the undesired wave source to the coupling device 20 and (b) the electromagnetic field intensity when the undesired wave source is positioned at the origin of the horizontal axis will be the curve B for the component inversely proportional to the distance R, as shown in FIG. 7.

Since the coupling device 20 includes the two loop antennas 21, 22 spaced from each other by the distance d2 and extracts the difference between the electric currents flowing in these loop antennas, respectively, the output value corresponding to the undesired wave is Udif1 that corresponds to the distance d3.

Here, when the power of emission of the undesired wave source is increased or the number of the undesired wave sources is increased, which causes the intensity of the undesired wave to increase in the neighborhood of the coupling device 20, then the curve B will shift upward to be the curve C, so that the value of Udif2 will be the output value corresponding to the undesired wave.

Figure 14:
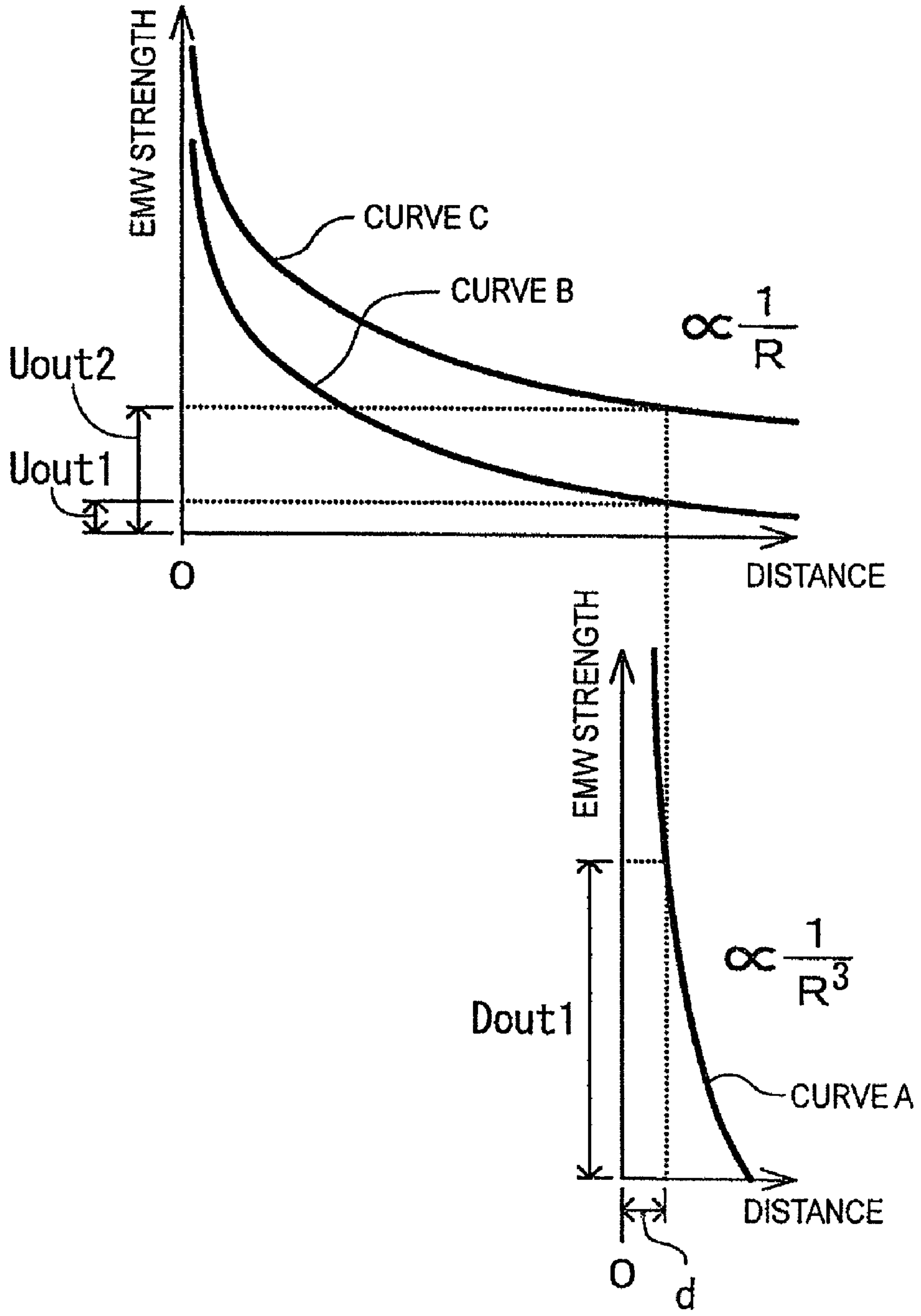
FIG. 14 illustrates the relationship of the output of a conventional coupling device and the distance between the coupling device and the wave source.

As is appreciated by comparing FIG. 7 and FIG. 14, the coupling device 20 according to one embodiment of the present invention, when compared with the conventional single electrostatically shielded loop antenna, is capable of suppressing the output of the coupling device 20 with respect to the undesired wave insofar as the wave source of the undesired wave is remote from the coupling device 20 by a distance larger than the distance d1 from the coupling device 20 to the balanced feeder line 10, even when the intensity of the undesired wave is increased, so that the coupling device 20 is always allowed to obtain a larger D/U ratio.

The following describes how to measure the strength of coupling of the coupling device 20 according to one embodiment of the present invention.

FIGS. 8A, 8B, 9A, and 9B help compare the strength of coupling of a conventional coupling device of a conventional single electrostatically shielded loop antenna with that of the coupling device 20 of the present invention. In FIGS. 8A, 8B, 9A, and 9B the horizontal axes represent a frequency, and the vertical axes represent a receiving sensitivity.

Figure 8A:
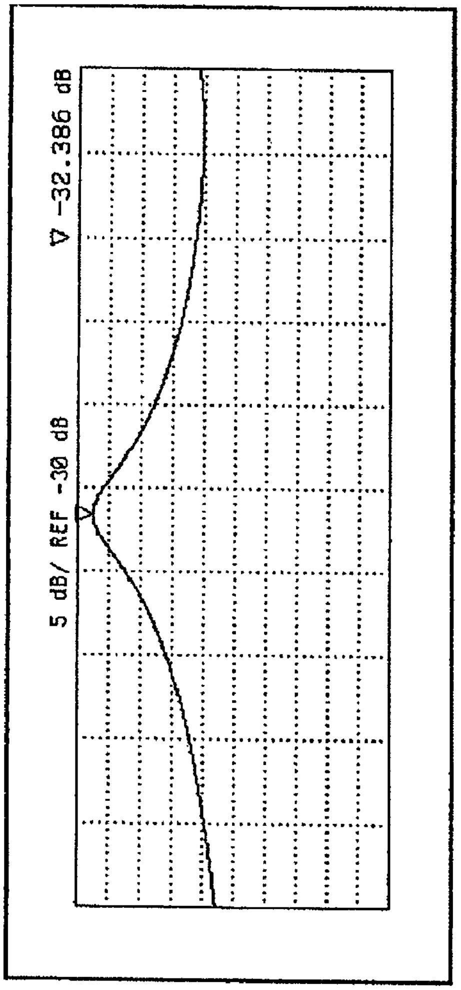
FIG. 8A explains the strength of coupling of a conventional coupling device (i.e., single electrostatically shielded antenna) for a wave source in its close proximity.

First, the distance R from the wave source to the coupling device 20 of the present invention or the conventional coupling device is specified as about 10 millimeters (i.e., the wave source is located in extremely close proximity to the coupling device). FIG. 8A shows a receiving sensitivity of the conventional single electrostatically shielded loop antenna, and FIG. 8B shows a receiving sensitivity near 150 MHz of the coupling device 20 of the present invention.

Referring to FIG. 8A, the conventional single electrostatically shielded loop antenna has a receiving sensitivity of about −32.4 dB as indicated by a white inverted triangle. Meanwhile, as shown in FIG. 8B, the coupling device 20 of the present invention has a receiving sensitivity of about −34.1 dB as indicated by a white inverted triangle. This means that, the receiving sensitivity of the coupling device 20 of the present invention is slightly lower, by −1.7 dB, than that of the conventional one.

Thus, it can be concluded that the coupling device of the present invention has substantially the same level of receiving intensity as that of the conventional single electrostatically shielded loop antenna when the distance R from the wave source to the coupling device is very small.

Figure 8B:
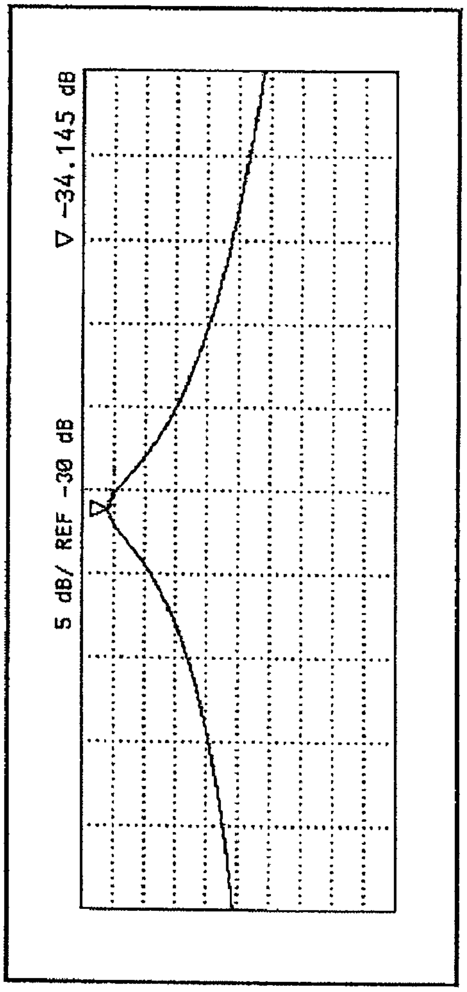
FIG. 8B explains the strength of coupling of the coupling device according to one embodiment of the present invention for a wave source in its close proximity.
Figure 9A:
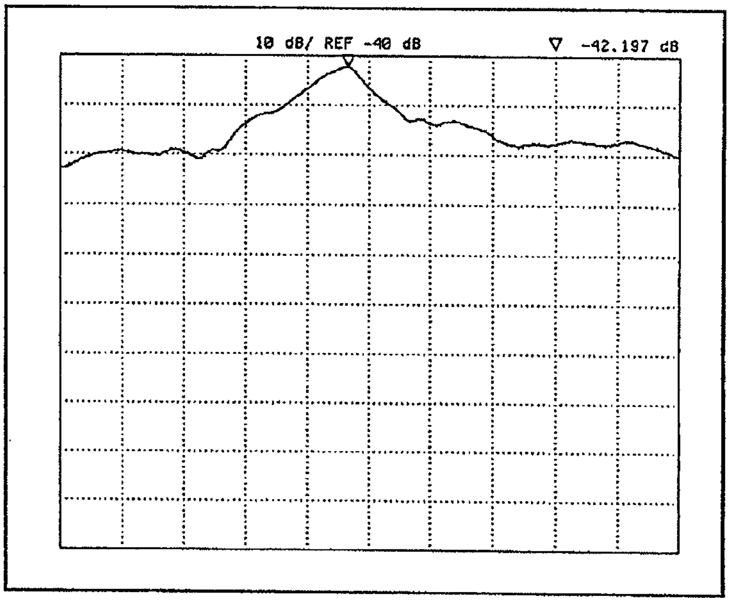
FIG. 9A explains the strength of coupling of the conventional coupling device for a distant wave source.
Figure 9B:
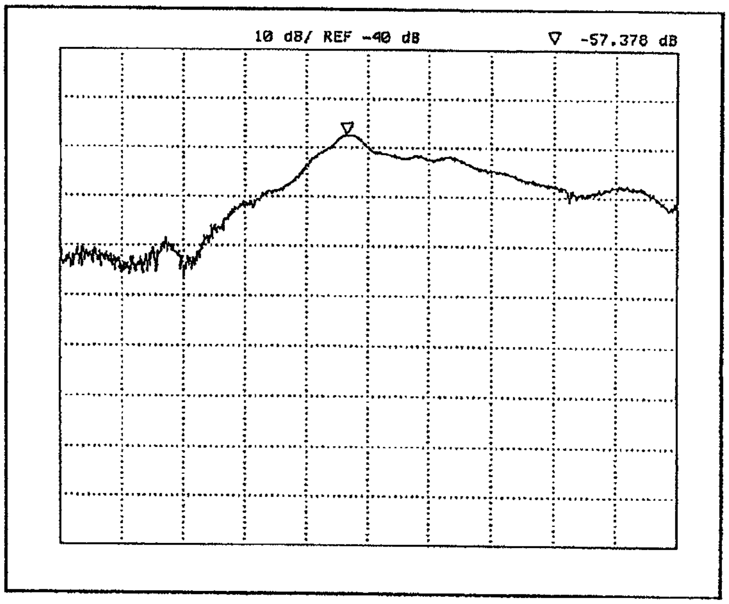
FIG. 9B explains the strength of coupling of the coupling device according to one embodiment of the present invention.

FIGS. 9A and 9B represent results of measurement in a case where the distance R from the wave source to the coupling device is about one hundred and fifty times larger than that shown in FIGS. 8A and 8B. FIG. 9A shows the receiving sensitivity of the conventional single electrostatically shielded loop antenna, and FIG. 9B shows the receiving sensitivity near 150 MHz of the coupling device 20 of the present invention.

Referring to FIG. 9A, the receiving sensitivity of the conventional single electrostatically shielded loop antenna has the receiving sensitivity of about −42.2 dB as indicated by a white inverted triangle, while the coupling device 20 of the present invention, as shown in FIG. 9B, has the receiving sensitivity of about −57.4 dB as indicated by a while inverted triangle. This means that the coupling device 20 of the present invention has a receiving sensitivity that is significantly smaller, by −15.2 dB, than that of the conventional single electrostatically shielded loop antenna.

Accordingly, it can be concluded that, when the distance R is sufficiently large, the coupling device 20 of the present invention more effectively suppresses the 1/R component that can reach a distant place than does the conventional single electrostatically shielded loop antenna.

This means that, since the example of FIGS. 8A and 8B can be treated as the case of the desired wave and the example of FIGS. 9A and 9B as the case of the undesired wave, the coupling device 20 of the present invention is capable of obtaining a larger D/U ratio than that of the conventional single electrostatically shielded loop antenna, and at the same time effectively suppressing the component of the undesired wave.

As has been fully described in the foregoing, the mobile body remote control system 120, according to the embodiments of the present invention, has the coupling device 20 capable of increasing the D/U ratio and at the same time reducing the occurrence of data failures even when there are undesired waves, such as electromagnetic waves emitted by other devices and components, so that favorable quality of communications is ensured.

Also, in the mobile body remote control system 120 of the present invention, since the distance between the guideway and the coupling device 20 is very small, the level of the electric field intensity (i.e., the strength of the radio wave) can be weak and it is not necessary to increase the electric field intensity for communications between the guideway and the coupling device.

Accordingly, as set forth in Ordinance for Enforcement of Japanese Radio Law as of December 2008, there is no need for getting a license for radio equipment operating with extremely low power of emission and no restriction on the frequency or the purpose, if the electric field intensity (i.e., the strength of the radio wave) is equal to or less than 500 μV/m (microvolt per meter) within 3 meters of the radio equipment, and regulations on the range of frequency to be used are less strict. Also, in other countries, radio equipment can be used without getting a license when the electric field intensity, for example, is equal to or less than 200 μV/m within three (3) or ten (10) meters from the radio equipment, depending on the frequencies used.

Further, unnecessary or spurious waves for other communications devices can be reduced and malfunction of those devices can be prevented.

The following describes three variations of configuration and arrangement of the balanced feeder line 10 and the coupling device 20 of the present invention.

The first variation of the balanced feeder line 10 and the coupling device 20 is the one shown in FIGS. 2 and 3.

The balanced feeder line 10 is positioned such that the center thereof (i.e., an intermediate portion between the two parallel conducting wires 10*a*, 10*b*) is found on a vertical line coinciding with the axis line of the concentrically arranged two loop antennas 21, 22 as shown in FIG. 2. Also, the plane defined by the two parallel conducting wires 10*a*, 10*b* is parallel to the planes of the loops defined by the loop antennas 21, 22, respectively. Further, the balanced feeder line 10 is spaced from the first loop antenna 21 by the distance d1.

This first arrangement is preferable in that the strength of coupling between the balanced feeder line 10 and the coupling device 20 can be increased.

It should be noted that the distance d1 only has to be such that the communications between the balanced feeder line 10 and the coupling device 20 are possible with the inductive magnetic field used as the primary medium of coupling.

It is preferable that the distance d1 be equal to or less than the distance d2.

Figure 10:
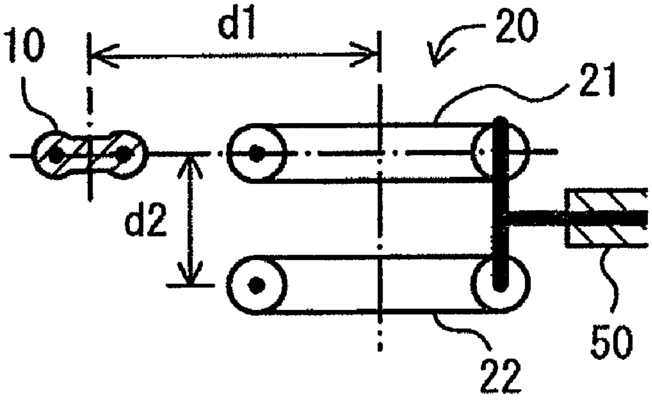
FIG. 10 illustrates an alternative arrangement of the coupling device and the balanced feeder line.

Next, referring to FIG. 10, illustrating a second variation of the arrangement of the balanced feeder line 10 and the coupling device 20, the second arrangement differs from the first arrangement as shown in FIG. 2 in that the plane on which the center of the balanced feeder line 10 is found comes level with and parallel to the plane of the loop of the first loop antenna 21.

The second arrangement, when compared with the first embodiment, is advantageous in a case where the mobile body communications system 120 should be made low-profile.

Figure 11:
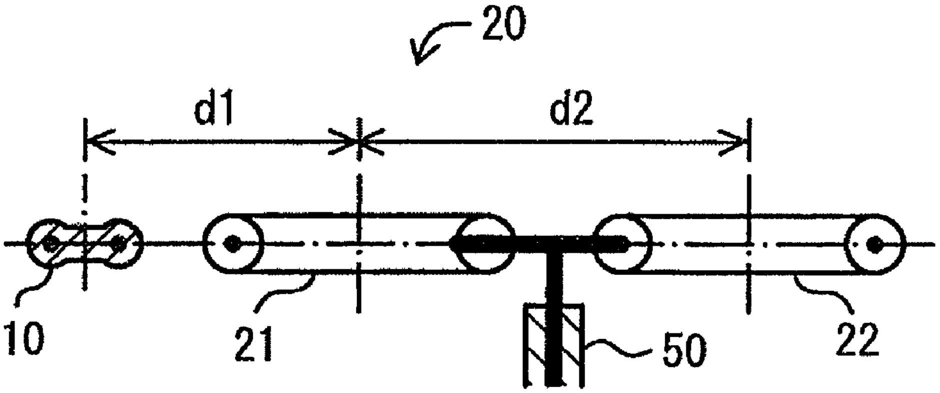
FIG. 11 illustrates another alternative arrangement of the coupling device and the balanced feeder line.
Figure 12:
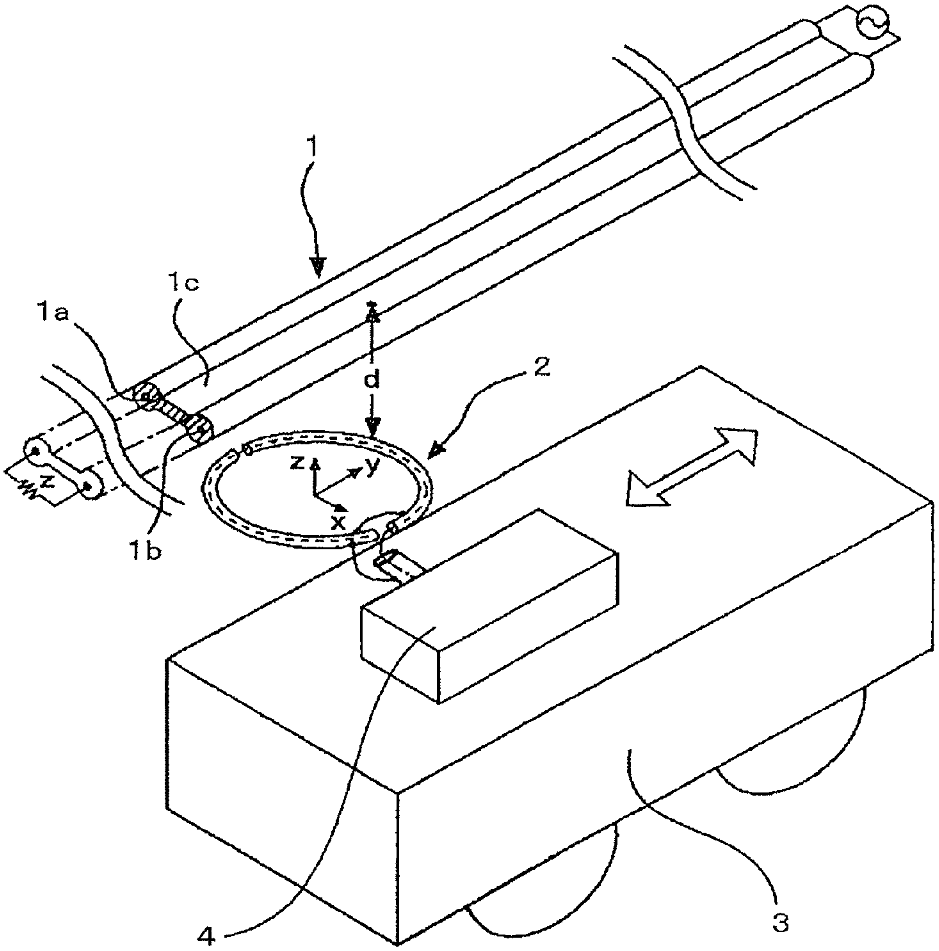
FIG. 12 PRIOR ART
FIG. 12 is a schematic view of principal parts of a mobile body remote control system having a conventional electrostatically shielded loop antenna.

Referring also to FIG. 11, illustrating a third arrangement of the balanced feeder line 10 and the coupling device 20, the third construction differs from the second variation shown in FIG. 10 in that the center of the balanced feeder line 10 is made level with and parallel to the plane of the loop of the first loop antenna 21, which further is made level with and parallel to the plane of loop of the second loop antenna 22.

The third variation, when compared with the second variation, is advantageous when the height of the mobile body communications system should be more low-profile than that of the second variation.

Arrangements of the balanced feeder line 10 and the coupling device 20 other than those described in the foregoing are possible, insofar as the degree of coupling between the balanced feeder line 10 and the first loop antenna 21 and the degree of coupling between the first loop antenna 21 and the second loop antenna 22 are sufficiently obtained, and the distance from the center of the balanced feeder line 10 to the center of the first loop antenna 21 is less than the distance from the center of the balanced feeder line 10 to the center of the second loop antenna 22.

In view of an increased degree of coupling, it is preferable that the angle of the balanced feeder line 10 be defined such that the plane defined by the two conductive wires 10*a* and 10*b* is orthogonal to the lines of magnetic induction given rise to by the loop antenna.

The coupling device 20 of the present invention serves not only as a receiving device, but also as a transmitting antenna. This means that, by switching one coupling device 20 using a switch or a branching filter, the coupling device 20 is capable of both receiving an inductive magnetic field given rise to by the balanced feeder line 10 and transmitting information from the transfer dolly.

Since the coupling device 20 of the present invention allows for the reversibility of transmission and reception to be established, when compared with a conventional single electrostatically shielded loop antenna, it can reduce radiation of radio waves to a distant place while the intensity of the signal output by the coupling device 20 can remain substantially unchanged.

Accordingly, the mobile body remote control system 120 of the present invention can reduce undesired or spurious waves for other communications devices.

Also, since the regulation on the use of radio waves in various countries contemplate electric field intensity with distances such as 3 meters and 10 meters, while meeting these requirements, it is possible to increase the intensity of the signal component inversely proportional to the cube of R emitted by the coupling device 20, so that occurrence of data failure can be reduced and thus stable and reliable communications can be achieved.

While the invention has been described in terms of specific embodiments, it will be understood by those skilled in the art that various modifications may be made therein without departing from the spirit and scope of the invention. Also, the terms and expressions which have been employed in this specification are used for description and not for limitation, there being no intention in the use of such terms and expressions of excluding equivalents of the features shown and described or portions thereof. Accordingly, the scope of this invention is only defined and limited by the following claims and their equivalents.

What is claimed is:

1. A mobile body remote control system comprising:

(a) a guideway for guiding a mobile body to a predetermined place, the guideway being a balanced feeder line including a pair of parallel conductor lines spaced from each other and a dielectric body supporting the parallel conductor lines; and (b) a coupling device provided on the mobile body for transmission and reception of control information used to control movement of the mobile body along the guideway, the coupling device including:

a first loop antenna having a pair of outputs and a second loop antenna having a pair of outputs that are cross-connected to the pair of outputs of the first loop antenna, a distance from a center of the guideway to a center of the first loop antenna being less than a distance from the center of the guideway to a center of the second loop antenna, said distance from the center of the guideway to the center of the first loop antenna being less than a distance from the center of the guideway to the center of the second loop antenna enabling said coupling device to extract a difference between an electric current flowing in the first loop antenna and an electric current in the second loop antenna, wherein when a wave source of an undesired wave is remote from the coupling device by a distance sufficiently larger than a distance from the coupling device to the balanced feeder line, even if an intensity of the undesired wave is increased, an output of the coupling device corresponding to the undesired wave is suppressed.

2. The mobile body remote control system according to claim 1, wherein the first loop antenna and the second loop antenna are electrostatically shielded loop antennas each made by bending a coaxial cable to take a shape of a loop, the coaxial cable having a slit on a portion of an outer shield thereof, a diameter of the first loop antenna and a diameter of the second loop antenna are each equal to or less than a tenth(($1/10$) of a wavelength ($\lambda$) of a radio wave for use in the transmission and reception of the control information, and the distance from the first loop antenna to the balanced feeder line is in a range from one thirtieth ($1/30$) to one two-hundredth ($1/200$) of the wavelength ($\lambda$).

3. The mobile body remote control system according to claim 2, wherein the first loop antenna and the second loop antenna are concentrically arranged and spaced from each other, and the center of the guideway is passed through by an axis line of the concentrically arranged first and second loop antennas.

4. The mobile body remote control system according to claim 2, wherein a center of the balanced feeder line is level with and parallel to a plane of the loop of the first loop antenna.

5. The mobile body remote control system according to claim 4, wherein the plane of the loop of the first loop antenna is level with and parallel to a plane of the loop of the second loop antenna.

6. The mobile body remote control system according to claim 1, wherein the wave source of the undesired wave is remote from the coupling device by a distance in an order of one hundred times larger than the distance from the coupling device to the balanced feeder line.

* * * * *